UNITED STATES PATENT OFFICE.

RICHARD HARTLEB, OF AACHEN, GERMANY, ASSIGNOR TO CHEMISCHE FABRIK RHENANIA, OF SAME PLACE.

METHOD OF INOCULATING SEEDS WITH MICRO-ORGANISMS.

SPECIFICATION forming part of Letters Patent No. 674,765, dated May 21, 1901.

Application filed January 18, 1901. Serial No. 43,762. (No specimens.)

*To all whom it may concern:*

Be it known that I, RICHARD HARTLEB, a citizen of Germany, residing at Botanisches Institute der Hochsschule, Aachen, in the Empire of Germany, have invented a certain new and useful Method of Inoculating Seeds with Micro-Organisms, (for which I have applied for a patent in Germany, dated February 23, 1900,) of which the following is a specification.

This invention relates to a method of inoculating seeds with micro-organisms. For this purpose the seeds in a suitable container are covered with pure water, so that they are mechanically cleaned, and the damaged or dead seeds float to the surface of the water. The water and impurities are then poured off and the cleaned seeds are covered with water impregnated with bacteroids. In this the seeds are left until they begin to swell, whereupon there is a loosening of the external husk of the seed and an increase in the volume of the grain, so that the seed offers an increased surface for the micro-organism and the latter obtains easy access, owing to the loosening of the husk. The seed thus prepared is sown directly without admixture of any other substance.

The application of this method is to the inoculation of seeds with bacteroids of the micro-organisms of the leguminosæ. Very shortly after the seed has become embedded in the soil nodule formation begins. The danger of killing the organisms necessary for the inoculation by harmful soil influences is effectively obviated, owing to the fact that these organisms in consequence of the rapid germination quickly become active. On the other hand, this danger of damage or death is always present in a seed which has been merely inoculated with the liquid and has not been allowed to swell therein, so that it is a long time in germinating.

Having thus described the nature of this invention and the best means I know of carrying the same into practical effect, I claim—

A method of inoculating seeds with micro-organisms, which consists in covering the seeds with pure water, and leaving them in the water until the damaged or dead seeds float to the surface of the water, pouring off the water with the contained impurities, then covering the cleaned seeds with water impregnated with bacteroids, and leaving them in such impregnated water until they begin to swell and the hulls thereof loosen, and finally sowing the seed without the addition of any other substance.

In testimony whereof I have hereunto set my hand in presence of two subscribing witnesses.

RICHARD HARTLEB.

Witnesses:
 FRITZ STOLLEWERK,
 G. SCOTT.